UNITED STATES PATENT OFFICE.

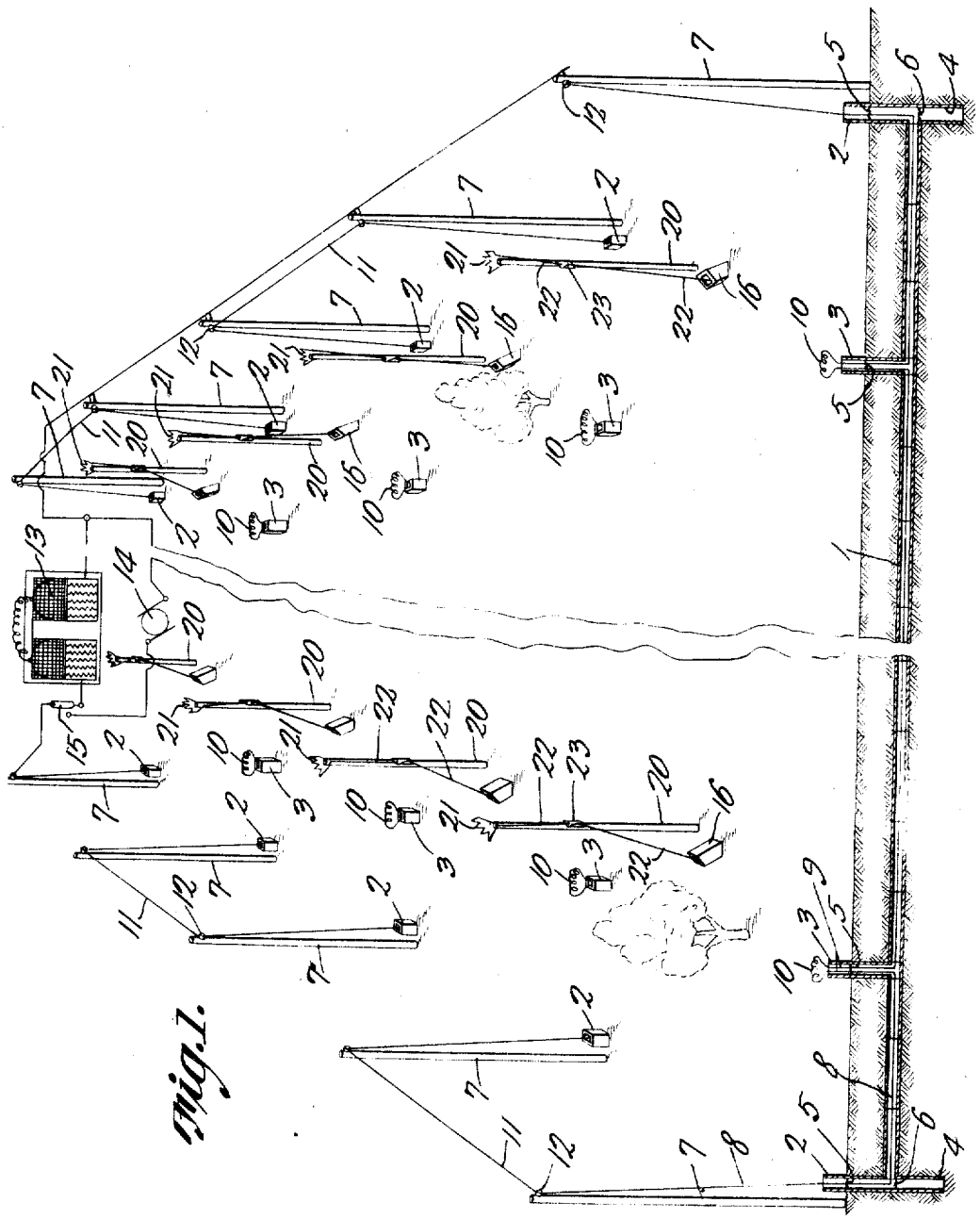

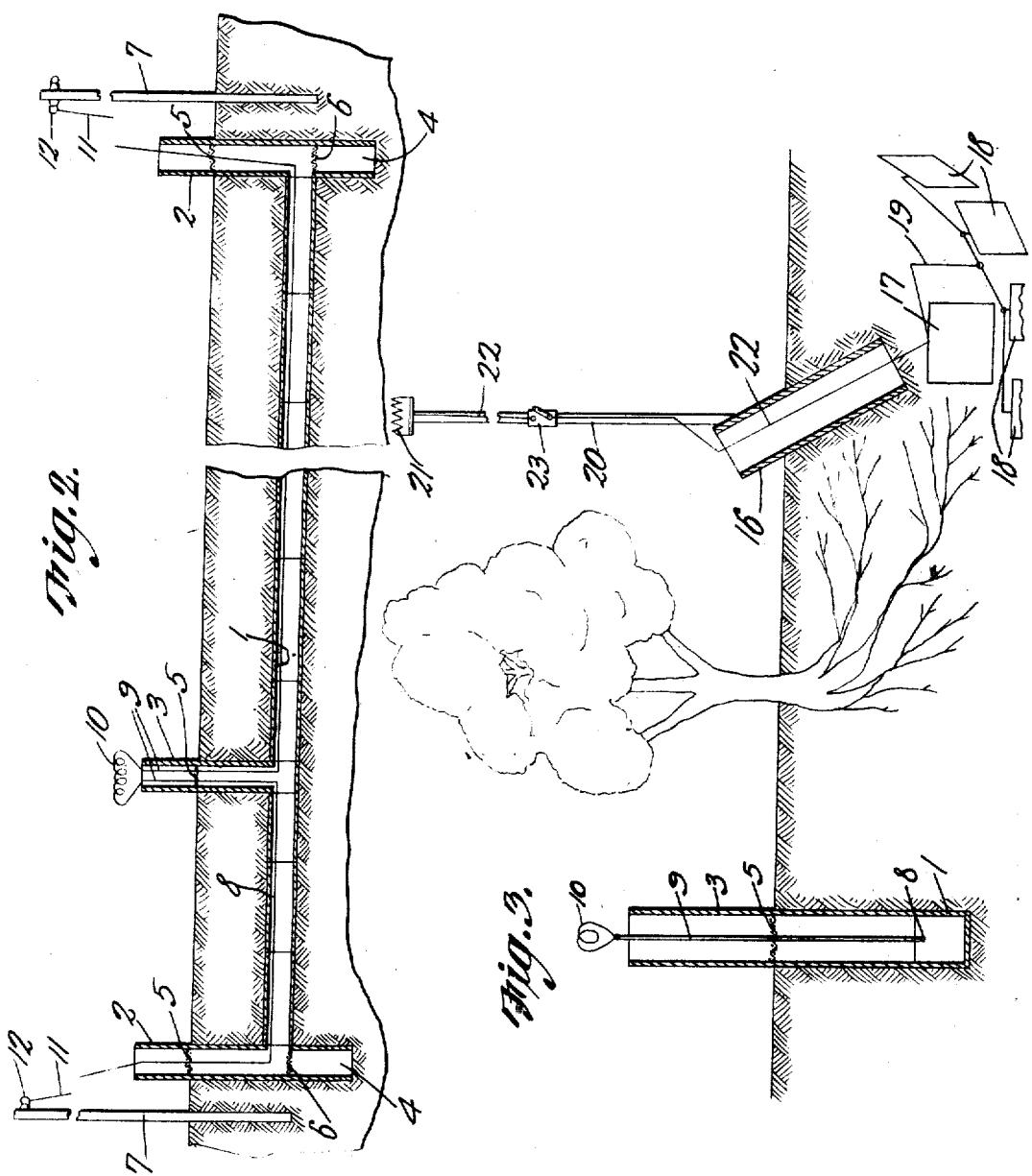

WARREN J. ANSON, OF SAN GABRIEL, CALIFORNIA, ASSIGNOR OF ONE-HALF TO GEORGE B. NICHOLS, OF LOS ANGELES, CALIFORNIA.

MEANS FOR PROMOTING VEGETATION.

1,204,637.   Specification of Letters Patent.   Patented Nov. 14, 1916.

Application filed July 19, 1915. Serial No. 40,739.

*To all whom it may concern:*

Be it known that I, WARREN J. ANSON, a citizen of the United States, residing at San Gabriel, in the county of Los Angeles and State of California, have invented a new and useful Means for Promoting Vegetation, of which the following is a specification.

The present invention appertains to means for promoting vegetation, and is an improvement over the means for promoting vegetation disclosed in my co-pending application Serial No. 667,535, filed December 23, 1911.
It is the object of the invention to provide novel and improved means for promoting the growth of various species of trees, plants, vegetables, and other vegetation, said means embodying a system or apparatus which calls into play, terrestrial electricity and magnetism for facilitating the growth of the vegetation, and for furnishing the vegetation with moisture throughout the period of its growth without the necessity of the vegetation being artificially watered.

The present system is also operable to prevent the vegetation from being scorched by the strong sun rays in the summer season, and for preventing the vegetation from being frosted in the fall, winter and spring.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a perspective diagrammatical view of the system, portions being broken away and portions being shown in section. Fig. 2 is an enlarged longitudinal section through one of the conduits, portions being broken away. Fig. 3 is an enlarged sectional view taken transversely through one of the conduits and taken through one of the inclined tiles and associate parts.

In carrying out the invention, parallel horizontal conduits 1 are embedded or planted in the soil at a depth of about 2 feet below the surface and are preferably constructed of porous tile. The conduits 1 preferably extend north and south. These conduits 1 are provided at their ends with risers or branches 2 projecting upwardly slightly above the surface of the soil, and each conduit is provided at suitable intervals or spaced points between its ends with upstanding risers 3 projecting slightly above the surface of the soil. The ends of the conduits 1 are provided with downwardly projecting drainage legs or branches 4 extending downwardly within the soil below the risers 2, although the legs or branches 4 may be provided at any suitable points along the conduits 1, preferably at the lowest portions thereof, so that the surplus water within the conduits will be drained downwardly through the legs 4. The risers 2 and 3, and the legs 4 are also preferably constructed of tile.

Fitted and secured within each of the risers 2 and 3 on a level with the surface of the soil, is a screen 5, which prevents rodents, reptiles, insects and other foreign objects from passing down the risers into the conduits, as would naturally be objectionable. Similar screens 6 are secured within the legs or branches 4 flush with the bottoms of the conduits 1 to prevent burrowing rodents, reptiles, worms, and the like, from passing upwardly into the conduits 1, but to enable the excessive moisture to drain off properly.

A post or pole 7 is planted in the soil adjacent each of the end risers 2, and an electrical wire or conductor 8 is carried by the posts 7 and passes through the conduits 1. The conductor 8 extends longitudinally through each of the conduits 1, and is provided with a pair of legs or leaders 9 projecting upwardly within each riser 3, the upper ends of the legs 9 being connected by a resistance coil 10 above and immediately adjacent the upper end of the riser 3, so that the resistance coils 10 are interposed in the conductor 8. The resistance coils 10 are exposed to the atmosphere for heating the same contiguous to the upper ends of the risers, whereby to establish the circulation of air within the conduits, warm air thus being supplied to the vegetation, and said air being electrically charged. At the ends of the conduits 1, the conductor 8 extends upwardly through the risers 2, and the conductor is arched between the risers 2 of the adjacent conduits 1, as at 11, the upper ends of the posts 7 carrying insulators 12 to which the arched portions 11 of the conductor are attached. The conductor is thus run overhead between the conduits 1 and posts 7, so as to be out of the way. The conductor extends back and forth through the successive conduits, so that the resistance coils 10 of the various conduits are connected in series. The conductor 8 is preferably insulated, especially where it passes through the screens 5, to prevent short circuiting.

In order to supply the conductor 8 with terrestrial or atmospheric electricity, the ends or terminals of the conductor 8 at one end of the field or acreage are connected to the opposite terminals of a collector 13 which attracts and collects terrestrial or atmospheric electricity.

When it is desired to run dynamical or voltaic current through the conductor 8, a dynamo or dynamical or voltaic source of electrical current 14 may be connected to the terminals of the conductor 8, the dynamo or source of electrical energy 14 being preferably connected to the conductor 8 parallel with the collector 13, and a switch 15 being employed for connecting either the collector 13 or the dynamo 14 in series with the conductor 8. This switch 15 may also be employed for cutting out both the collector 13 and dynamo 14 from the circuit, to open the circuit.

Inclined tiles or hollow open ended members 16 are planted or embedded in the soil between or at the sides of the conduits 1, there being one or more of the tiles 16 for each riser 3, and the risers 3 and tiles 16 of the various pairs being separated sufficiently to enable the trees, plants, or other vegetation to be planted in the soil between them. The tiles 16 are inclined toward the trees or plants planted in the soil adjacent the risers 3, or between said risers and tiles 16.

A zinc plate 17 is embedded in the soil below the lower end of each tile 16, and a series or plurality of auxiliary plates 18 are embedded in the soil in a scattered arrangement adjacent each plate 17, and said main plate 17 and its auxiliary plates 18 are connected by suitable conductors 19.

A post or pole 20 is planted in the soil adjacent each tile 16, and carries a collector 21 at its upper end for attracting and collecting terrestrial electricity and magnetism, and the collector 21 is connected by a conductor or wire 22 with the main plate 17. The conductors 22 pass downwardly through the tiles 16, and a rheostat 23 is preferably carried by each post 20 and is interposed in the respective conductor 22, whereby the rheostats 23 may be adjusted for varying the resistance offered by the conductors 22.

With the present system, it has been found that trees, plants, and other vegetation, will thrive when planted in the soil in which the system is installed, this being due to various reasons which will be pointed out presently.

The zinc plates 17 being embedded in the soil will attract and collect the earth's magnetism, and the magnetic charges will be distributed from the plates 17 to the plates 18. The soil surrounding or in the vicinity of the plates 17 and 18 is thus charged with magnetic electricity, this being facilitated due to the fact that the collectors 21 will attract atmospheric or terrestrial electricity which will be conducted downwardly to the plates 17 and 18 by the conductors 22. Due to the charging of the soil with the statical and magnetic electricity, it has been found that beneficial results are obtained. It is also possible that the statical charges are transmitted to the growing plants or trees, from the plates 17 through the tiles 16, to promote the growth of the vegetation.

The conduits 1 and associate parts are of advantage also for several reasons. During hot periods, the conduits 1 will provide chambers in the soil in which cool air can collect, and due to the presence of moisture in and around the conduits 1, the cool air and vapor in flowing from the risers 3 will serve to supply cool air and moisture to the vegetation to minimize the liability of the vegetation being scorched. Moisture will accumulate around and within the conduits 1, for cooling the air therein, and for also assisting in the conservation of the moisture near the surface of the soil. When the collector 13 is in circuit with the conductor 8, it will supply said conductor with terrestrial or atmospheric electricity, and when the dynamo or source of electrical energy 14 is in circuit with said conductor, a dynamical or voltaic current will flow through the conductor 8 to electrify the media within and surrounding the conduits 1, and to also heat the resistance coils 10. This is of advantage in cool weather, and when frosts are liable to occur, since the heating of the resistance coils 10 will heat the air surrounding the vegetation for warding off frost. The collector 13 is useful for charging the conductor 8 with statical or atmospheric electricity, while the dynamo 14 is useful for supplying the said conductor with dynamical or voltaic current.

The placing of the conduits 1 north and south is of advantage, since it promotes the flow of the earth's magnetic lines of force along and within the conduits 1.

The present system is useful and advantageous for various agricultural or farming purposes, for promoting the growth of various trees, vegetables, plants, and other vegetation, the terrestrial or dynamical electricity being called into play for sub-electrifying the soil to the ends above noted. The charging of the soil and adjacent air will promote the growth of the vegetation, as is well recognized, and furthermore, the moisture will be attracted and conserved so that the vegetation will be supplied with moisture throughout the growing season, without the necessity of artificially watering the vegetation during dry seasons or drought.

The charging of the soil or media surrounding the conduits 1 and tiles 16, is rendered more positive and effective, by a liberal distribution of iron, brass and copper filings within the conduits and tiles, the iron filings setting up electrical currents, while the brass and copper filings are efficient conductors of electricity.

The conduits 1 being porous permit the moisture to seep therethrough into the ground, which in connection with the attraction of the moisture from the lower depths by the plates 17 and 18, and the charging of the soil, effectively accelerates the growth of the vegetation and plant life.

The system will be found of advantage in arid lands or districts, due to the fact that the moisture from the sub-soil or lower depths is raised and collected near the surface, and little or no irrigation is necessary.

Due to the fact that the conduits 1 are constructed of porous tile, the air may pass from within the conduits into the soil to aerate the roots of the vegetation, thereby to assist in the growth of the plans, since the aeration of the soil and roots is as important as cultivation, and performs practically the same function. The air within the conduits being cool will condense the moisture, which in clinging to the walls of the conduits will readily seep therethrough into the soil.

The present system confers numerous benefits to the vegetation, since the electrification of the soil and air is beneficial, as well as the functions of aerating and moistening the soil.

Having thus described the invention, what is claimed as new is:

1. Means for promoting vegetation comprising an air circulating porous conduit embedded in the soil and having open risers projecting above the surface thereof near the vegetation for the circulation of air, and an electrical conductor extending through the conduit and having legs projecting upwardly and connected by resistance coils above and immediately adjacent the upper ends of said risers, said coils being exposed to the atmosphere for heating the same contiguous to the upper ends of said risers, and electrically charging the air.

2. Means for promoting vegetation comprising parallel air circulating porous conduits embedded in the soil, said conduits having open risers at their ends and other open risers between their ends near the vegetation, and an electrical conductor extending back and forth through said conduits and passing through the first mentioned risers, the conductor having legs projecting upwardly through the second mentioned risers and connected by resistance coils disposed above and immediately adjacent the upper ends of the second mentioned risers, said coils being exposed to the atmosphere for heating the same contiguous to the upper ends of the second mentioned risers and to electrically charge the air.

3. Means for promoting vegetation comprising a conduit embedded in the soil and having risers projecting above the surface thereof, hollow open ended members embedded in the soil and projecting thereabove at the side of said conduit and its risers, magnetic plates embedded in the soil below said members, and collectors of atmospheric electricity connected to said plates.

4. Mean for promoting vegetation comprising a hollow open ended member embedded in the soil and projecting thereabove, a magnetic plate embedded in the soil below said member, and a series of secondary plates embedded in the soil at scattered points adjacent the first mentioned plate and connected thereto.

5. Means for promoting vegetation comprising a porous conduit embedded in the soil and having risers projecting above the surface thereof, an electrical conductor extending through the conduit and having resistance coils interposed therein above said risers, hollow open ended members embedded in the soil and projecting thereabove, said members being located at one side of said conduit and its risers, magnetic plates embedded in the soil below said members, posts planted in the soil adjacent said members, collectors of atmospheric electricity carried by said posts, and conductors connecting the respective collectors and plates and extending through said members.

6. Means for promoting vegetation comprising in combination with a porous conduit embedded in the soil and having risers projecting above the surface thereof, of a system for sub-electrifying the soil embodying an electrical conductor extending through the conduit and having resistance coils interposed therein above said risers, a collector of atmospheric electricity connected to said conductor, hollow open-ended members embedded in the soil and projecting thereabove, said members being located at the side of said conduit and its risers, magnetic plates embedded in the soil below said members, posts planted in the soil adjacent said members, collectors of atmospheric electricity carried by said posts, the last mentioned collectors being independent of the first mentioned collector, and independent conductors between the last mentioned collectors and the respective magnetic plates.

In testimony that I claim the foregoing as my own, I have hereto affixed my signature in the presence of two witnesses.

WARREN J. ANSON.

Witnesses:
F. W. ARMSTRONG,
G. B. NICHOLS.